April 26, 1949. S. T. CARTER 2,468,290
ARTICLE ALIGNING MEANS FOR CONVEYERS
Filed Dec. 28, 1945 3 Sheets-Sheet 1
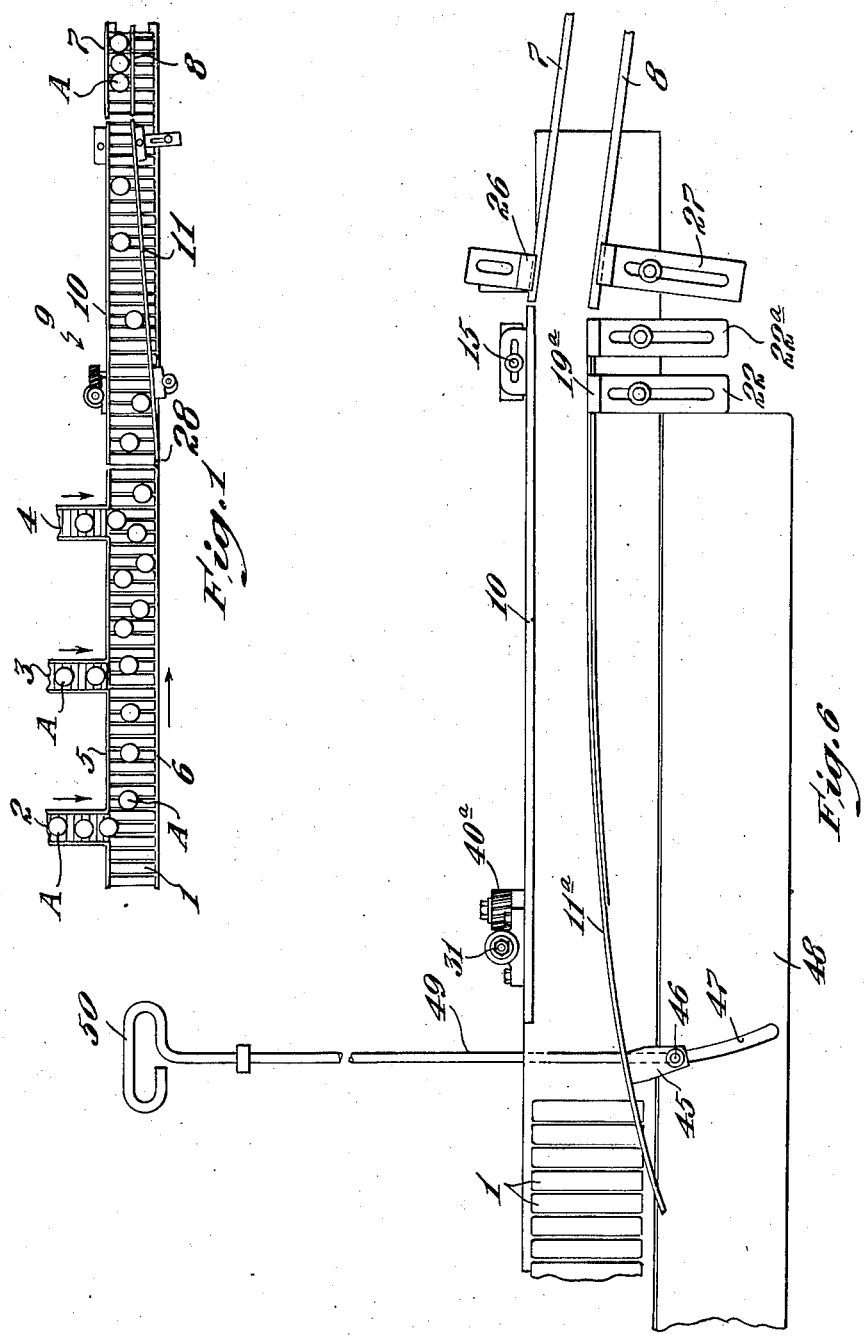
Inventor
Sidney T. Carter
by Roberts Cushman Crown
att'ys.

April 26, 1949.  S. T. CARTER  2,468,290
ARTICLE ALIGNING MEANS FOR CONVEYERS
Filed Dec. 28, 1945  3 Sheets-Sheet 2
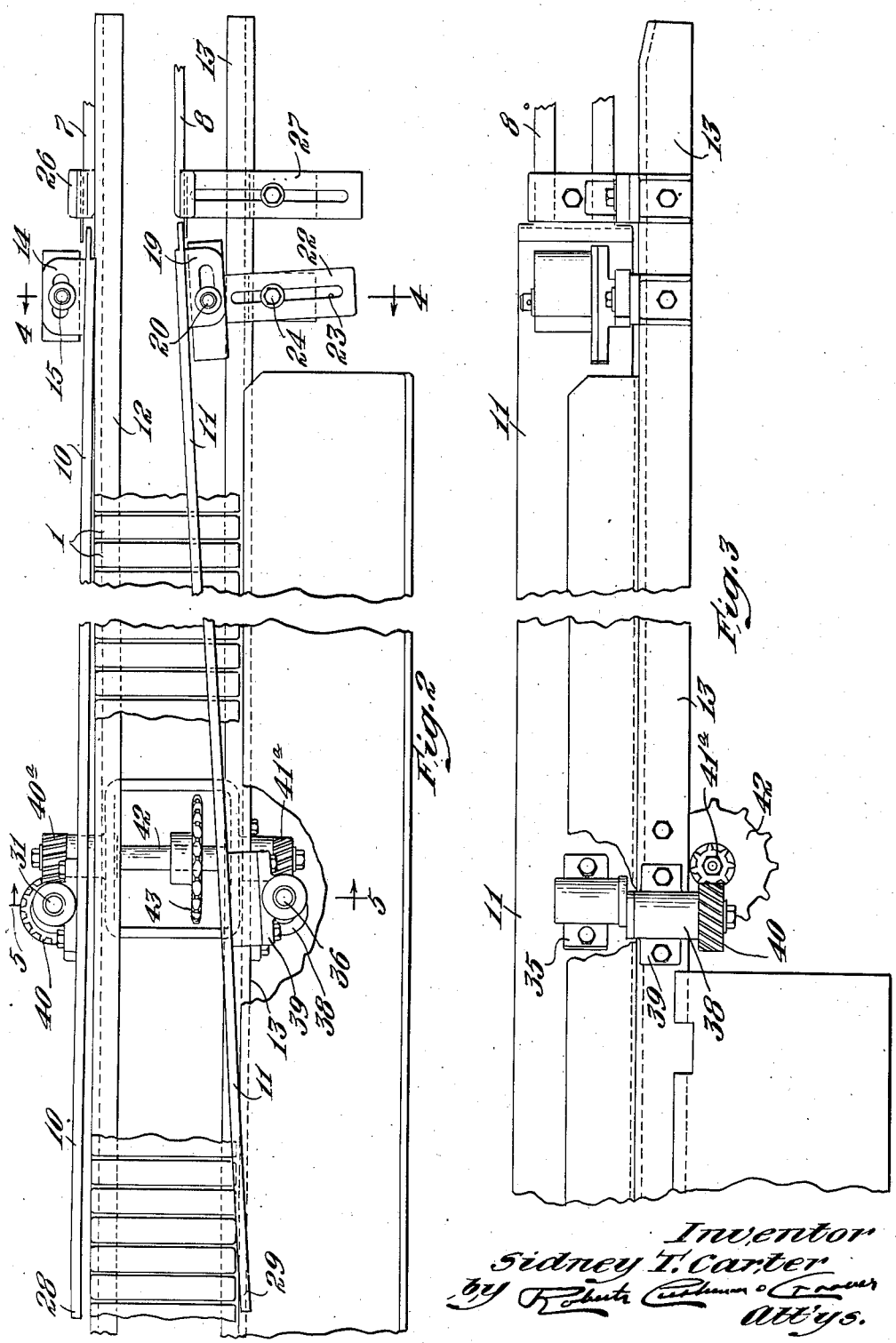
Inventor
Sidney T. Carter
by Roberts Cushman & Grover
Att'ys.

April 26, 1949.   S. T. CARTER   2,468,290
ARTICLE ALIGNING MEANS FOR CONVEYERS
Filed Dec. 28, 1945   3 Sheets-Sheet 3

Inventor
Sidney T. Carter
by Roberts Cushman & Grover
Att'ys.

Patented Apr. 26, 1949

2,468,290

UNITED STATES PATENT OFFICE 2,468,290

ARTICLE ALIGNING MEANS FOR CONVEYERS

Sidney T. Carter, Worcester, Mass., assignor to Economic Machinery Company, Worcester, Mass., a corporation of Massachusetts Application December 28, 1945, Serial No. 637,680

3 Claims. (Cl. 198—30)

This invention pertains to conveyors and more particularly to an automatic article-aligning means for conveyors. While of more general utility, the article-aligning means of the present invention is especially intended for use with labeling apparatus wherein two or more label-applying machines deliver the labeled articles, for instance bottles, to the same delivery conveyor.

When several label-applying machines (or other machines or devices) deliver articles to a single moving belt conveyor, the articles from the several machines usually flow toward the conveyor along paths whose points of convergence with the conveyor path are spaced longitudinally of the latter. The conveyor belt is usually of a width substantially greater than the width of the article being conveyed, and articles delivered by the several labeling machines, or even by the same machine, commonly take up different positions widthwise of the conveyor belt as they are delivered thereto. However, it is often desirable that all of the articles be disposed in a single line (that is to say, in tandem arrangement) at some portion of the conveyor path, for instance as they approach its delivery end. In the endeavor to obtain such an arrangement of the articles, it has heretofore been proposed to provide convergent stationary guides at opposite sides of the conveyor path designed to crowd the articles transversely of the conveyor and into a single line. Were the articles entirely frictionless such an arrangement might function reasonably well, but due to frictional contact of the articles, irregularities in shape, and other factors, the transverse movement of the article by fixed convergent guides, often results in the jamming of the articles and sometimes actual breakage.

The principal object of the present invention is to provide automatically acting aligning means so designed as to insure the desired arrangement of the articles in a single line on the conveyor belt without substantial danger of jamming or injury to the articles.

A further object is to provide aligning means so designed as to impart a rapid vibratory motion to the articles upon the conveyor as they are being moved into alignment, thereby to facilitate the intermeshing of the articles and to avoid jamming as they are moved into alignment. A further object is to provide article-aligning means of simple, inexpensive, but durable and reliable construction, applicable to existing conveyors without substantial modification of the latter. Other and further objects and advantages of the invention will be pointed out in the following more detailed description and by reference to the accompanying drawings wherein Fig. 1 is a diagrammatic fragmentary plan view of a conveyor embodying the present invention;

Fig. 2 is a fragmentary plan view, to larger scale, of the aligning device of the present invention;

Fig. 3 is a fragmentary front elevation of the parts shown in Fig. 2;

Fig. 6 is a view generally similar to Fig. 2, but illustrating a modification.

Figure 4:
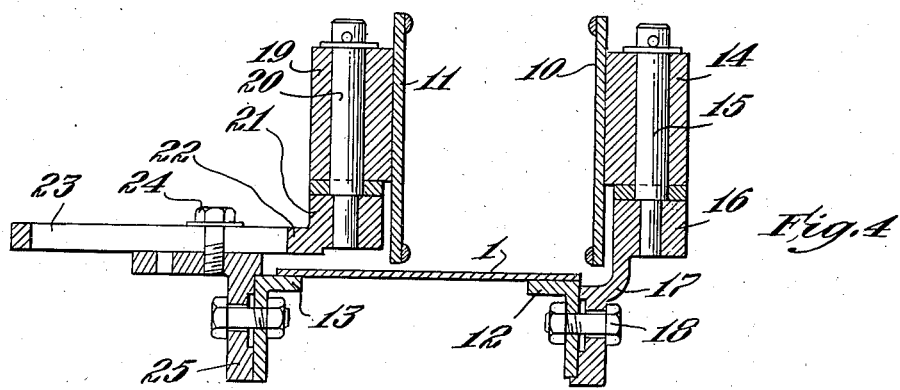
Fig. 4 is a fragmentary vertical section on the line 4—4 of Fig. 2.

Referring to the drawings the numeral 1 (Fig. 1) designates article-conveying means here shown by way of example, but without limitation, as an endless belt having a horizontal run constituting a support for the articles A and operative to move them along a substantially rectilinear horizontal path. As suggested in Fig. 1, the articles A are delivered into this conveyor path by feeding devices, for instance conveyors 2, 3, 4, etc., arranged to deliver the articles into the conveyor path at points spaced longitudinally of the latter. The receiving portion of the conveyor path, into which the articles are thus fed, is shown as defined by fixed parallel guides 5 and 6, arranged at opposite sides respectively of the belt 1, the guides being spaced apart a distance greater than the maximum transverse dimensions of the articles A. For instance, if these articles are bottles standing on the belt 1, the space between the guides 5 and 6 is greater than the diameters of the bottles. Such a spacing of the guides is desirable to insure free entry of the articles from the several feeding conveyors into the conveyor path, but results in the disposition of the articles A at different points transversely of the conveyor path.

Beyond that part of the path into which the articles are fed there is another portion of the path, for convenience termed the delivery portion, defined by normally relatively fixed guides 7 and 8, these guides being parallel and spaced apart a distance substantially equal to the transverse dimensions of the articles, that is to say, if the articles are bottles, the spacing of the guides 7 and 8 is but slightly greater than the diameter of the bottles, so that in passing along this portion of the path the articles A must move in tandem arrangement.

In accordance with this invention, article-aligning means 9 is interposed between the receiving portion of the path and the delivery portion, the aligning means 9 being designed to crowd the articles transversely across the path as they travel along the path, so as to bring them into tandem arrangement as they enter the delivery portion of the path defined by the guides 7 and 8.

The aligning means 9 (Figs. 2, 3, 4 and 5), in accordance with the present invention, comprises a pair of elongate guides or deflectors 10 and 11, the guide 10, as here illustrated, extending substantially parallel to one edge of the belt, while the other guide or deflector 11 extends diagonally of the belt and in converging relation to the guide 10.

Figure 5:
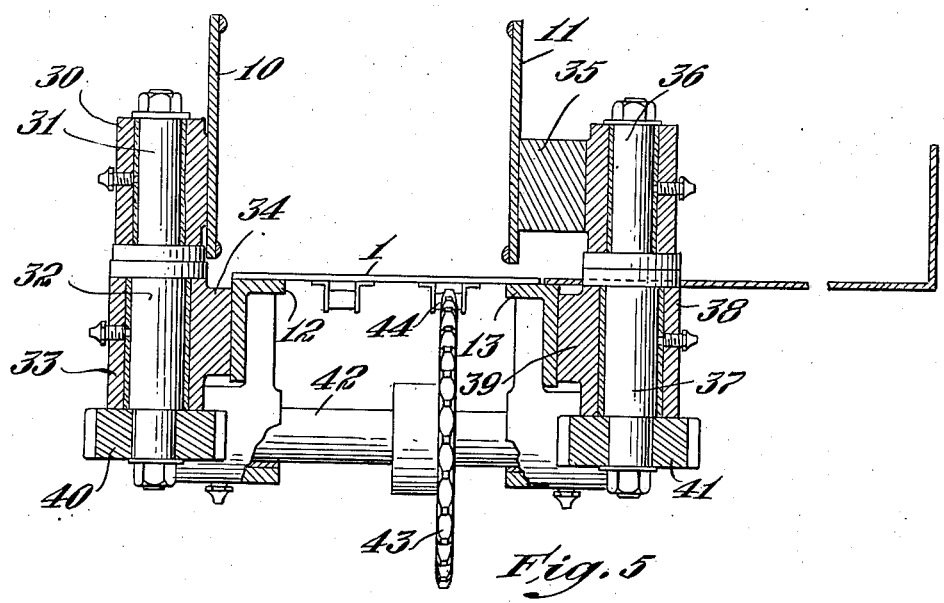
Fig. 5 is a fragmentary vertical section on the line 5—5 of Fig. 2.

At this portion, at least, of the conveyor apparatus, the belt is supported near its opposite edges by parallel normally fixed but vertically adjustable rails 12 and 13 (Figs. 4 and 5).

The guides 10 and 11 converge toward each other in the direction of movement of the articles along the conveyor path, and their adjacent ends are spaced apart a distance approximating the distance between the fixed guides 7 and 8, these adjacent ends of the guides 10 and 11 herein being termed the "delivery" ends for convenience in description. The delivery end of the guide 10 is secured to a member 14, herein shown as vertically elongate and having a horizontally elongate slat which receives a pivot pin 15 (Fig. 4), whose lower end is fixed in a boss 16 forming part of a bracket 17 which is secured to the supporting rail 12 by a bolt 18, or equivalent means.

The delivery end of the guide 11 (Fig. 4) is secured to a vertically elongate member 19 having a horizontally elongate slot which receives a pivot pin 20 whose lower end is fixed in a boss 21 carried by a horizontally elongate arm 22 (Fig. 2) having a longitudinal slot 23 which receives a bolt 24 by means of which the arm 22 is adjustably secured to a bracket 25 attached to the supporting rail 13. By loosening the bolt 24 the member 22 may be moved from front to rear, thus varying the distance between the delivery ends of the guides 10 and 11 so as to adjust these ends to accommodate articles of different transverse dimensions.

The receiving end of the guide rail 7 is mounted in a fixed bracket 26 (Fig. 2) which may be secured to the supporting rail 12, while the receiving end of the normally fixed guide 8 is secured to an elongate horizontal arm 27, similar to the arm 22, provided with an elongate slot receiving a bolt by means of which the arm 27, and thus the end of the rail 8, may be adjusted horizontally. The receiving end of the rail 8 may thus be spaced from the rail 7 to correspond to the spacing of the delivery ends of the rails 10 and 11.

As illustrated in Figs. 1 and 2, the free or left-hand ends 28 and 29 of the guides 10 and 11 are spaced apart substantially the full width of the belt 1, the guides being free to swing about the pivot pins 15 and 20, respectively.

The guide 10 is secured at a point intermediate its ends to a vertically elongate bearing member 30 (Fig. 5) which receives a vertically elongate crank pin 31 projecting in eccentric relation from the upper end of a vertical shaft 32 mounted to turn in a bearing 33 forming part of a bracket 34 which is fixed to the supporting rail 12.

The guide 11 is secured at a point intermediate its ends to a member 35 having a portion which constitutes a bearing for a crank pin 36 projecting in eccentric relation from the upper end of a shaft 37 turning in a bearing in a part 38 carried by a bracket 39 which is secured to the supporting rail 13.

The shafts 32 and 37 are provided at their lower ends with pinions 40 and 41 respectively, which mesh with gears 40ª and 41ª (Fig. 2) respectively, secured to the opposite ends of a horizontal shaft 42 arranged below the conveyor 1 and extending transversely of the latter. A sprocket wheel 43 is fixed to the shaft 42 and meshes with sprocket elements 44 (Fig. 5) carried by the belt 1, whereby movement of the belt turns the sprocket wheel 43 and the shaft 42 and thus drives the shafts 33 and 37 with their crank pins 31 and 36 respectively. The turning of these crank pins vibrates the guides 10 and 11 transversely and longitudinally of the conveyor path. The crank pins 31 and 36 may be so arranged as to cause the guides 10 and 11 to move toward and away from each other simultaneously, or they may be so arranged that the rails 10 and 11 move simultaneously in the same direction transversely of the conveyor path. This vibratory movement of the guides 10 and 11 imparts a like vibratory movement to the articles moving along on the belt 1, and thus as the articles are being crowded together in moving between the converging guides 10 and 11, they are prevented from jamming, and thus flow smoothly toward the entrance to the space between the fixed rails 7 and 8 and into proper tandem relationship.

In the arrangement illustrated in Fig. 6, the guide 10 with its vibrating means and its pivotal support is substantially as hereinbefore described, but the guide 11ª which is associated therewith, comprises a leaf spring or equivalent construction fixed at its delivery end to the part 19ª supported by the adjustable brackets 22 and 22ª.

This resilient guide 11ª is normally curved so as to diverge from the delivery end of the rail 10, and when contacted by articles moving along the conveyor path it is free to deflect slightly in response to any jamming of the articles between it and the guide 10, so as to prevent any massing of the articles such as might cause stoppage or breakage. This resilient guide 11ª, in cooperation with the vibratory rigid guide 10, is very effective in aligning the articles in tandem arrangement, and in avoiding any difficulties from jamming of the articles as they are brought into tandem arrangement. Preferably the free end of the guide 11ª is secured to a bracket member 45 having a pin 46 designed to travel in a curved slot 47 in a fixed part 48, and to this pin is attached one end of a manually actuable rod 49 having a handle 50 at its opposite end. If, by any chance the articles should become jammed, in the space between the converging guides 10 and 11ª, the operator, by manipulation of the handle 50, may deflect the resilient guide 11ª out of its normal position and away from the guide 10, thus increasing the space between the guides and permitting any articles which have become blocked between these guides to free themselves and move on along the conveyor path.

While certain desirable embodiments of the invention have been illustrated by way of example, it is to be understood that the invention is broadly inclusive of any and all modifications falling within the terms of the appended claims.

I claim:
1. In combination with means for moving arti- cles along a predetermined path, aligning means operative to move articles transversely of said path thereby to dispose them in tandem relation, said aligning means comprising article-contacting guides disposed at opposite sides respectively of said path, said guides converging in the direction of article movement, means pivotally supporting the adjacent ends of the guides to permit them to swing, a bearing secured to each of said guides at a substantial distance from its pivotal support, a crank pin arranged within each bearing, and means for rotating the crank pins, thereby to vibrate the free end portions of the guides.

2. In combination with a conveyor belt for moving articles along a predetermined path, article-aligning means associated with the belt and comprising a pair of elongate guides converging in the direction of belt movement and arranged respectively at opposite sides of said path, means pivotally supporting the adjacent ends of the guides to permit them to swing about vertical axes, said supporting means being relatively adjustable transversely of the belt, a bracket secured to each of said guides at a substantial distance from its pivotal support, each bracket comprising a bearing portion, a crank pin arranged to turn in each of said bearings, respectively, a shaft carrying each crank pin, a pinion fixed to each shaft, a shaft extending transversely across the conveyor path but out of the path of the articles moving on the belt, gears fixed to said transverse shaft which mesh with the pinions on the crank shafts respectively, a sprocket fixed to said transverse shaft, and means carried by the belt for turning the sprocket.

3. In combination with a conveyor belt for moving articles along a predetermined path, article-aligning means associated with the belt operable to move articles transversely of said belt thereby to dispose them in tandem relation, said article-aligning means comprising article-contacting guides disposed at opposite sides of the belt, said guides converging in the direction of article movement, means pivotally supporting the adjacent ends of said guides to permit them to swing, a bearing secured to each of said guides, a crank pin arranged to turn in each of said bearings respectively, a shaft carrying each crank pin, a pinion fixed to each shaft, a shaft extending transversely across the conveyor path below the belt, gears fixed to said transverse shaft which mesh with the pinion on the crank shafts respectively, a sprocket fixed to said transverse shaft, and a flexible rack secured to the under side of the belt for engagement with the sprocket and by movement of the belt to effect rotation of the sprocket.

SIDNEY T. CARTER.

REFERENCES CITED

The following references are of record in the file of this patent:

UNITED STATES PATENTS

| Number | Name | Date |
| --- | --- | --- |
| 1,196,442 | Eick | Aug. 29, 1916 |
| 1,713,684 | Wild | May 21, 1929 |
| 2,315,880 | Stiles | Apr. 6, 1943 |
| 2,373,600 | Richey | Apr. 10, 1945 |